Patented Nov. 7, 1950

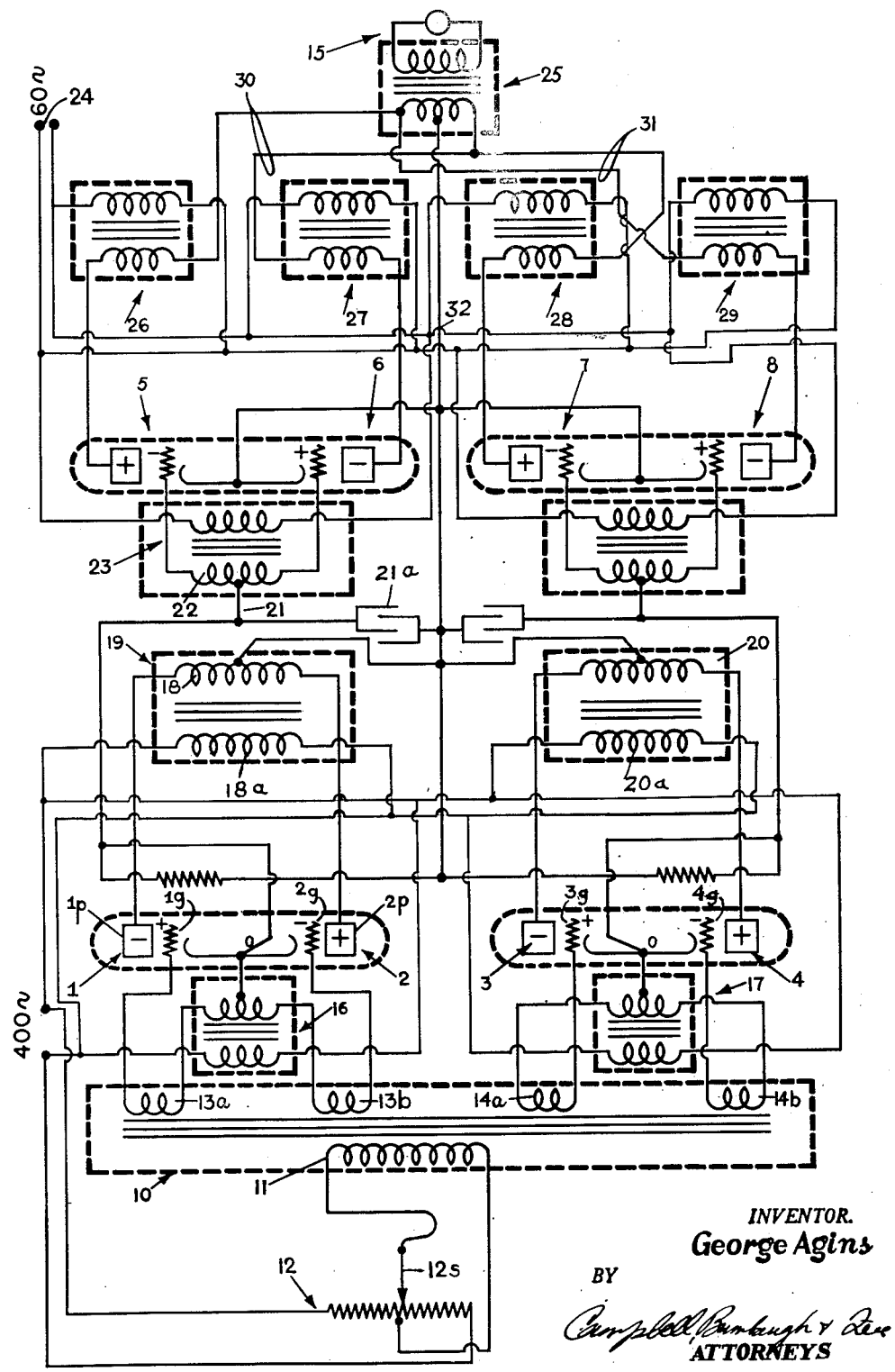

2,529,065

UNITED STATES PATENT OFFICE 2,529,065

SERVO SYSTEM

George Agins, Brooklyn, N. Y., assignor to Arma Corporation, Brooklyn, N. Y., a corporation of New York Application July 20, 1946, Serial No. 685,091

6 Claims. (Cl. 318—289)

This invention relates to servo-systems, and has particular reference to vacuum tube amplifiers for use in driving electric motors in the servo-systems used in calculating mechanisms, for example, although the invention is not limited to that use.

In accordance with the present invention, an amplifier for servo-systems and the like is provided in which the usual external or internal direct current plate supply is not needed, since the amplifier operates through a signal cycle on alternating current and handles both polarities of signal voltage at the relatively high frequency desirable for electrical calculations and from which a strictly similar, powerful, relatively low-frequency current is obtained for use in the motor.

In a preferred embodiment of the invention, the applied high-frequency signal voltage is fed through a suitable multiple-secondary transformer to produce a multiple effect, the several induced voltages being so separated that each polarity of the signal voltage is amplified by a different amplifier than the opposite polarity of the same, and, furthermore, each amplifier is itself divided so that the action occurs in one portion of the amplifier for one polarity of half-waves of the high frequency alternating supply current, and in another portion of the amplifier for the other half-waves of the supply current, thus avoiding the use of an external or internal source of direct current plate supply at any point in the circuit. The two halves of the rectified and amplified signal are then recombined, but the amplifications representing positive signal voltages are combined independently of the amplifications representing the negative signal voltages of the same. The rectified high-frequency outputs are next introduced separately into a pair of duplex low-frequency alternating current amplifiers and, finally, all outputs of the low-frequency tubes are recombined to produce a powerful modulation of the low-frequency carrier, accurately similar to the input signal applied to the high frequency section.

It will be seen that the amplifier of this invention, adapted especially for servo-systems, avoids the use of an external or internal source of direct current plate supply at any point in its or the accompanying signal circuits and, notwithstanding high and low frequency requirements, maintains the signal and motor voltages strictly similar at all times, thus affording extreme accuracy and fidelity in following the input signal.

For a more complete understanding of the invention, reference may be had to the accompanying drawing, in which:

The figure is a conventional wiring diagram of a preferred arrangement of the elements of the invention.

The primary winding 11 is energized by an A. C. signal voltage of reversible phase and variable amplitude supplied by a center-tapped potentiometer 12 whose winding end taps are electrically connected to the 400 cycle A. C. supply. The phase of the signal reverses when the direction of the displacement of the slider from the center tap changes, and the amplitude of the signal voltage is proportional to the magnitude of the displacement of the slider from the center tap.

The secondary windings 13a, 13b, 14a and 14b supply signal voltages to the grids and cathodes of the respective tubes 1, 2, 3 and 4. The connections from secondary windings 14a and 14b may be transposed with respect to the connections from secondary windings 13a and 13b, to obtain the required phase relationship, so that, for example, when the instantaneous signal polarity on grids 1g and 4g of respective tubes 1 and 4 is positive, the instantaneous signal polarity on grids 2g and 3g of respective tubes 2 and 3 is negative, and vice versa. By this means, positive signals are handled by the left-hand channel and negative signals by the right-hand channel of the amplifier unit, which assures that servo-motor 15 will rotate, say, clockwise for positive signals and counter-clockwise for negative signals, in accordance with the function of such a servo-system.

A transformer 16 connected to secondary windings 13a and 13b, applies 400 cycle current to the grids 1g and 2g to bias them to cut-off, and a similar transformer 17 is arranged between the secondary windings 14a and 14b to bias grids 3g and 4g to cut-off, so that no current is consumed under stand-by conditions in these tubes. The plates 1p and 2p are supplied with voltage from the center tapped secondary winding 18 of transformer 19, whose primary winding 18a is energized from the 400 cycle source, so that when plate 1p is negative, plate 2p is positive and vice versa. Hence, tube 1 operates on one set of half-waves of the 400 cycle supply and tube 2 on the other set of half-waves, which avoids the use of an external or internal source of direct current plate supply in the amplifier. The plates of tubes 3 and 4 are similarly energized from the secondary winding of a transformer 20, whose primary winding 20a is in series with winding 18a in the 400 cycle supply. It will be observed that the primary windings of all transformers 16, 17, 19 and 20 are connected as shown in parallel and to the 400 cycle source and phased for the purpose of obtaining and maintaining the required phase relationships throughout the system.

Considering the operation of the apparatus so far described, the displacement of slider 12s from the center tap of the potentiometer 12, to the left, for example, renders the grid 2g less negative during the half cycle when plate 2p is positive, and the grid 1g less negative during the other half cycle when plate 1p is positive, so that tubes 1 and 2 conduct alternately during the cycle. Tubes 1 and 2 are of the vacuum type and are operated as a pair of grid-controlled rectifier tubes to provide amplification and full-wave rectification of the signal voltage.

Filter condenser 21a and condenser discharge resistor 33 are electrically connected in parallel across the output leads of the full-wave amplifier-rectifier.

The positive polarity of the D. C. output voltage of tubes 1 and 2 is applied to the grids of amplifying tubes 5 and 6 through wire 21 and the center tap on the secondary winding 22 of grid bias transformer 23, while the negative polarity is applied directly to the cathodes of tubes 5 and 6.

The displacement of the slider of the potentiometer as above described, also renders grid 3g more negative during the half cycle when the plate of tube 3 is positive, and the grid 4g more negative during the other half cycle when the plate of tube 4 is positive, so that both tubes 3 and 4 are blocked.

When the displacement of the slider from the center tap of the potentiometer is to the right, tubes 1 and 2 are blocked, and control is taken by tubes 3 and 4 and the right-hand channel. In amplifiers 5 and 6 a low-frequency supply is used, such as that from 60 cycle source 24, and the amplifying action is quite similar to that of the tubes 1 and 2. Thus, the power transformers 26 and 27, whose primary windings are in the 60 cycle line and whose secondary winding circuits include the plates of respective tubes 5 and 6, put the necessary positive voltage on the corresponding plates momentarily operating.

These secondary windings of transformers 26 and 27 are connected by wires 30 to the primary winding of the input transformer 25 for the control field winding of reversible type servo-motor 15, so that the 60 cycle half-waves are properly combined in transformer 25. The right-hand system includes duplex tubes 7 and 8 and corresponding power transformers 28 and 29 whose secondary windings are connected by wires 31 to the primary winding of motor transformer 25, but oppositely to the connections from transformers 26 and 27. The right-hand system feeds alternatively with the left-hand system so that the servo-motor 15 gets the result of overall signal amplification.

It will be observed that the primary windings of the power transformers 26, 27, 28 and 29, like those of transformers 16, 17, 19 and 20, are all in parallel and connected to the source 24 of low-frequency power, and phased for the purpose of obtaining and maintaining the required phase relationships throughout the system. The primary parts of the system are represented by conventional symbols and perform the corresponding function so that further explanation is unnecessary, except to state that the right- and left-hand portions are identical in construction and operation, in the manner described.

Although a preferred embodiment of the invention has been illustrated and described herein, it is to be understood that the invention is not limited thereby, but is susceptible of changes in form and detail within the scope of the appended claims.

I claim:

1. In a servo-system amplifier for receiving an alternating current signal of reversible phase, variable amplitude and given frequency, the combination of a source of alternating current of said given frequency, a pair of full-wave rectifier means responsive, respectively, to one phase and to the reverse phase of said signal for rectifying alternating current from said source, a source of alternating current of different frequency, a pair of push-pull amplifier means responsive, respectively, to the outputs of said pair of rectifier means, and energized by alternating current from said source of different frequency, and means for combining the respective outputs of said push-pull amplifier means such that the output of one push-pull amplifying means has one phase while the output of the other push-pull amplifying means has the reverse phase, said combined outputs forming an alternating current of said different frequency, and said amplifier being entirely free from any external or internal D. C. plate supply source.

2. In a servo-system amplifier for receiving an alternating current signal of reversible phase, variable amplitude and given frequency, the combination of a source of alternating current of said given frequency, a pair of full-wave rectifier means responsive, respectively, to one phase and to the reverse phase of said signal for rectifying alternating current from said source, a plurality of filter means for smoothing the outputs of said rectifier means, a source of alternating current of different frequency, a pair of push-pull amplifier means responsive, respectively, to the smoothed outputs of said pair of rectifier means, and energized by alternating current from said source of different frequency, means for combining the respective outputs of said push-pull amplifier means such that the output of one push-pull amplifying means has one phase while the output of the other push-pull amplifying means has the reverse phase, said combined outputs forming an alternating current of said different frequency and said amplifier being entirely free from any external or internal D. C. plate supply source and a servo-motor connected to receive the alternating current output of said combining means.

3. In a servo-system amplifier for receiving a relatively high frequency alternating current signal of reversible phase and variable amplitude, the combination of transformer means receiving said high frequency signal and providing a plurality of outputs representative thereof, a source of alternating current of said high frequency, a pair of grid controlled full-wave rectifier means having grid electrodes receiving the outputs of said transformer means for rectifying alternating current from said high frequency source, the grids of one pair being responsive to one phase of said signal and to half waves thereof of opposite sense, respectively, and the grids of the other pair being responsive to the opposite phase of said signal and to half waves thereof of opposite sense, respectively, a plurality of filter means for smoothing the outputs of said pair of rectifier means, a source of relatively low frequency alternating current, a pair of push-pull connected amplifying means comprising electron discharge devices having plate and control grid electrodes, means energizing the plate electrodes of said discharge devices from said low frequency source, means supplying the smoothed output of one of said first pairs of rectifying means to the control grids of one of said second pairs of push-pull amplifying means, means supplying the smoothed output of the other of said first pairs of rectifying means to the control grids of the other of said second pairs of push-pull amplifying means and means for combining the outputs of said pair of push-pull amplifying means in the form of alternating current waves of one phase and of the reverse phase, respectively, said amplifier being entirely free from any external or internal D. C. plate supply source.

4. In a servo-system amplifier for receiving a relatively high frequency signal of variable amplitude and reversible phase, the combination of a source of alternating current of said relatively high frequency, grid controlled rectifier means for rectifying alternating current from said source, the control grids of said rectifying means being responsive only to one phase of said signal and to half waves thereof of opposite sense, respectively, filter means for smoothing the output of said rectifier means, a source of alternating current of relatively low frequency, push-pull amplifier means having plate and control grid electrodes, means for energizing said plate electrodes from said low frequency source, means for supplying the smoothed output from said first rectifier means to the control grids of said push-pull amplifier means and means responsive to the output of said push-pull amplifier means, said amplifier being entirely free from any external or internal D. C. plate supply source.

5. In a servo-system amplifier for receiving a signal of variable amplitude, reversible phase and fixed frequency, the combination of a pair of electron discharge devices each having plate, control grid and cathode electrodes, a source of alternating current of said fixed frequency, first transformer means having a primary winding energized from said source and having a tapped secondary winding connected to the plate electrodes of said electron discharge devices, means for biasing the control grid electrodes of said discharge devices substantially to cut-off by alternating current of said fixed frequency and of predetermined phase and amplitude with respect to the voltages applied to said plate electrodes, means for supplying said signal to said control grid electrodes to decrease the bias thereon only when said signal is of a given phase, a resistor connected from the tap on said transformer secondary winding to the cathodes of said discharge devices, filter means connected to said resistor, a second pair of electron discharge devices each having plate, control grid and cathode electrodes, a second source of alternating current of different fixed frequency, second transformer means having primary winding means energized from said second source and having secondary winding means connected to the plate electrodes of said second pair of discharge devices, means for biasing the control grids of said second discharge devices substantially to cut-off by alternating current of said different frequency and of predetermined phase and amplitude with respect to the voltage applied to the plate electrodes of said second discharge devices, and means for supplying the filtered output from said first pair of discharge devices to the control grids of said second pair of discharge devices to change the bias thereon as a function of said signal when it has said given phase, whereby the amplitude and phase, respectively, of the current flowing in the circuit including the plate electrodes of said second discharge devices is in correspondence with the amplitude and phase of said signal.

6. In a servo-system amplifier for receiving a signal of variable amplitude, reversible phase, and fixed frequency, the combination of two pairs of electron discharge devices each having plate, control grid and cathode electrodes, a source of alternating current of said fixed frequency, a pair of transformer means having primary windings energized from said source and having tapped secondary windings connected to the plate electrodes of each pair of discharge devices, respectively, means for biasing the control grid electrodes of said discharge devices substantially to cut-off by alternating currents of said fixed frequency and of predetermined phases and amplitudes with respect to the voltages applied to the corresponding plates thereof, means for supplying said signal to the control grid electrodes of one of said pairs of discharge devices to decrease the bias thereon only when said signal is of a given phase, means for supplying said signal to the control grid electrodes of the other of said pairs of discharge devices to decrease the bias thereon only when said signal is of reverse phase, a pair of resistors connected from the taps on the transformer secondary windings to the cathodes of the corresponding pairs of discharge devices, respectively, a plurality of filter means connected to said resistors, second two pairs of electron discharge devices each having plate, control grid and cathode electrodoes, a source of alternating current of different fixed frequency, second transformer means having primary winding means energized by said source of different frequency and having a plurality of secondary winding means connected to the plate electrodes of said second two pairs of discharge devices, respectively, means for biasing the control grids of said second two pairs of discharge devices substantially to cut-off by alternating currents of said different frequency and of predetermined phases with respect to the voltages applied to the corresponding plate electrodes, means for supplying the filtered output of one of said first pairs of discharge devices to the control grids of one of said second pairs of discharge devices to reduce the bias thereon only when said signal is of given phase, means for supplying the filtered output of the other of said first pairs of discharge devices to the control grids of the other of said second pairs of discharge devices to reduce the bias thereon only when said signal is of reverse phase, third transformer means having a primary winding connected to receive alternating current of one phase flowing in the circuit including the plate electrodes of one of said second pairs of discharge devices and to receive alternating current of reverse phase flowing in the circuit including the plate electrodes of the other of said second pairs of discharge devices, and having a secondary winding, and a servomotor connected to said last-named secondary winding.

GEORGE AGINS.

REFERENCES CITED

The following references are of record in the file of this patent:

UNITED STATES PATENTS

| Number | Name | Date |
| --- | --- | --- |
| 1,684,137 | Mittag | Sept. 11, 1928 |
| 2,399,695 | Satterlee | May 7, 1946 |
| 2,423,228 | Conklin | July 1, 1947 |
| 2,424,568 | Isbister et al. | July 29, 1947 |
| 2,434,259 | Burton | Jan. 13, 1948 |